United States Patent [19]
Kinoshita et al.

[11] Patent Number: 5,979,625
[45] Date of Patent: Nov. 9, 1999

[54] FIXING STRUCTURE FOR OUTER RING IN ONE-WAY CLUTCH

[75] Inventors: Yoshio Kinoshita; Toshio Awaji, both of Shizuoka-ken, Japan

[73] Assignee: NSK-Warner K.K., Tokyo, Japan

[21] Appl. No.: 08/330,571

[22] Filed: Oct. 28, 1994

[30] Foreign Application Priority Data

Nov. 2, 1993 [JP] Japan ........................................ 5-65635

[51] Int. Cl.⁶ .................................................. F16D 41/00
[52] U.S. Cl. ........................................................ 192/41 R
[58] Field of Search ................................. 142/41 R, 45, 142/45.1; 188/82.84

[56] References Cited

U.S. PATENT DOCUMENTS

| | | | |
|---|---|---|---|
| 3,344,686 | 10/1967 | Baker | 192/45.1 X |
| 4,757,887 | 7/1988 | Ostrander et al. | 192/41 A |
| 4,874,069 | 10/1989 | Lederman | 192/45 |
| 4,883,152 | 11/1989 | Froment | 192/42 |
| 4,979,600 | 12/1990 | Zanoni | 192/41 A |
| 5,004,090 | 4/1991 | Kuribara et al. | 192/45 X |
| 5,042,628 | 8/1991 | Malecha | 192/45 |
| 5,076,408 | 12/1991 | Numata et al. | 192/41 A |
| 5,139,123 | 8/1992 | Rutke | 192/45.1 |
| 5,156,245 | 10/1992 | Fujiwara et al. | 192/41 A |
| 5,328,012 | 7/1994 | Takata | 192/45 |

FOREIGN PATENT DOCUMENTS

| | | |
|---|---|---|
| UNW-5180 | 3/1991 | Japan . |
| 4-109231 | 9/1992 | Japan . |

*Primary Examiner*—Rodney H. Bonck
*Attorney, Agent, or Firm*—Evenson, McKeown, Edwards & Lenahan, P.L.L.C.

[57] ABSTRACT

A fixing structure is provided for an outer ring in an one-way clutch. The fixing structure includes a ring-shaped leaf spring having angular waviness and interposed between an outer side wall of the outer ring and a opposing inner wall of a housing. The ring-shaped leaf spring defines a cut formed in a radial direction to make the ring-shaped leaf spring discontinuous as viewed in an angular direction, whereby the ring-shaped leaf spring is integrally assembled by resilient force, which acts in radial directions, on the outer ring or an outer periphery of a side plate mounted on the outer ring. Any axial movement of the ring-shaped leaf spring is limited by a portion of the side plate.

5 Claims, 5 Drawing Sheets

FIXING STRUCTURE FOR OUTER RING IN ONE-WAY CLUTCH

BACKGROUND OF THE INVENTION a) Field of the Invention

This invention relates to a fixing structure for an outer ring in a one-way clutch which is used as a torque-transmitting or backstop component in a drive system of an automotive vehicle or the like.

b) Description of the Related Art

As is appreciated from a side cross-sectional view of FIG. 9 and also from a front view of FIG. 10 in which a part of a side wall 60 has been cut away, a one-way clutch is constructed of an outer ring 10, an inner wall 20, the side wall 60 mounted on a side wall of the outer ring 10, etc. Each spline 15 formed on an outer peripheral wall of the outer ring 10 is fitted in a corresponding keyway 46 formed in a housing 45, so that the outer ring 10 and the housing 45 are fixedly united together. Designated at numeral 30 is a stopper ring which serves to achieve positioning of the outer ring 10 in an axial direction.

An internal mechanism of the one-way clutch comprises, as shown by cutting away the part of the side wall 60 in FIG. 10, a number of rollers 50 arranged between a cam surface 90 on an inner peripheral wall of the outer ring 10 and an outer peripheral wall of the inner ring 20, springs 70 maintained in contact with leading ends of the respective rollers 50 as viewed in an idling direction, and spring anchors 80 for the respective springs 70. As long as the inner ring 20 rotates clockwise as indicated by arrow $R_1$ in FIG. 10, no locking action is performed.

The housing 45 is a casting so that no accurate dimensions can be expected thereon. To cope with this problem, a clearance a is left between the spline 15 of the outer ring 10 and a wall of its corresponding keyway 46 of the housing 45 as illustrated in FIG. 11.

When the inner ring 20 rotates clockwise (in the idling direction) or counterclockwise (in a locking direction), the outer ring 10 is also caused to rotate in the same direction due to drag torque of the rollers 50, leading to the inconvenience that a side wall of the spline 15 is caused to hit a side wall of the keyway 46 and a sharp metallic hitting noise is hence produced.

To fix the outer ring 10, it was therefore proposed, as shown in FIG. 9, to interpose a spring 40 between the outer ring 10 and an opposing inner wall 45a of the housing 45 so that the outer ring 10 is always pressed against the stopper ring 30 to avoid occurrence of such a sharp metallic hitting noise.

According to this conventional approach, however, the spring 40 is a separate part so that the spring 40 has to be assembled at the user's end prior to assembling the one-way clutch on the housing 45. This has resulted in the drawbacks that more assembling steps are needed and the assembly work is cumbersome and time-consuming.

SUMMARY OF THE INVENTION

With the foregoing in view, the present invention has as a primary object the provision of a fixing structure for an outer ring in a one-way clutch, which is free or substantially free of the above-described inconvenience, drawbacks and the like.

As a result of an extensive investigation, the present inventors have found that the primary object of the present invention can be achieved by forming a radial cut in the spring to make the spring discontinuous as viewed in the direction of its periphery, in other words, in an angular direction.

In one aspect of the present invention, there is thus provided a fixing structure for an outer ring in an one-way clutch, said fixing structure including a ring-shaped leaf spring having angular waviness and interposed between an outer side wall of the outer ring and a opposing inner wall of a housing. The ring-shaped leaf spring defines a cut formed in a radial direction to make the ring-shaped leaf spring discontinuous as viewed in an angular direction, whereby the ring-shaped leaf spring is integrally assembled by resilient force, which acts in radial directions, on the outer ring or an outer periphery of a side plate mounted on the outer ring. Any axial movement of the ring-shaped leaf spring is limited by a portion of the side plate.

The ring-shaped leaf spring employed in the fixing structure according to the present invention has resilient force in radial directions owing to the provision of the cut. When the leaf spring is widened a little and fitted on the outer ring or the outer periphery of the side plate, the resilient force acts toward a center of the ring-shaped leaf spring so that the leaf spring can be integrally assembled on the outer ring or the side plate.

Further, it is possible to limit axial axial movement of the leaf spring by a portion of the side plate.

The ring-shaped leaf spring is in an integral structure with the outer ring. Upon assembling the one-way clutch on the user's end, fewer assembly steps are need and the assembly work itself is easier.

In addition, use of a wire of a modified shape for the production of such ring-shaped leaf springs makes it possible to form the ring-shaped leaf springs in good yield and hence, at low cost.

DETAILED DESCRIPTION OF THE INVENTION AND PREFERRED EMBODIMENTS

Figure 1:
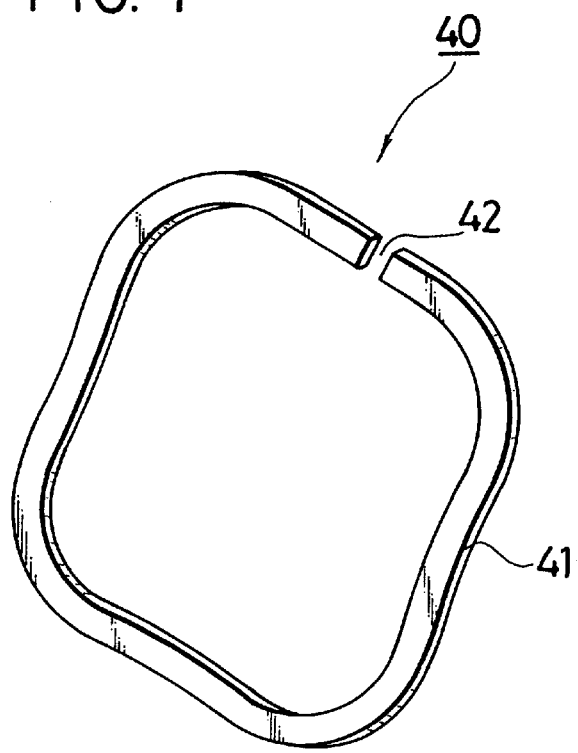
FIG. 1 is a perspective view of a spring useful in the practice of the present invention.
Figure 2:
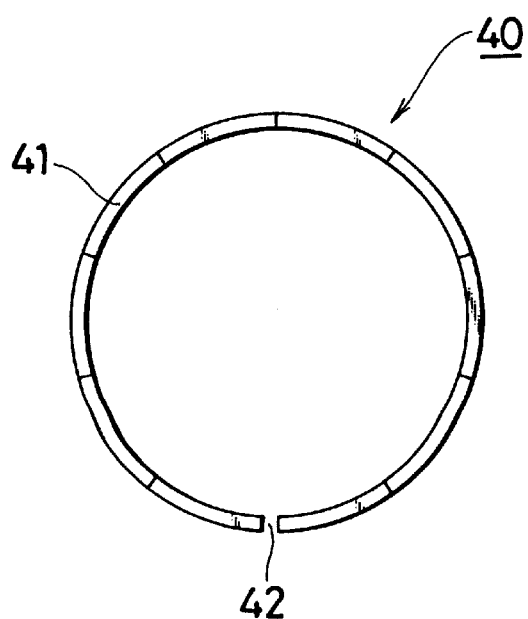
FIG. 2 is a front view of the spring.
Figure 3:
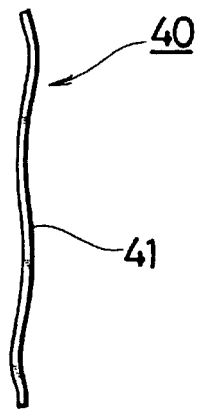
FIG. 3 is a side view of the spring.

Referring first to FIGS. 1 through 3, the spring useful in the practice of the present invention will be described. The spring, generally designated at numeral 40, is formed of a waved plate portion 41 having plural waved parts arranged at an interval along a periphery of said ring-shaped leaf spring, and defines a cut 42 formed in a radial direction to make said ring-shaped leaf spring discontinuous as viewed in an angular direction. Because of the cut 42, the spring 40 is not a complete ring unlike conventional springs of the wave washer type. The spring 40 is therefore allowed to move freely in the radial direction and, when fitted on an outer ring 10, resilient force acts toward a center of the spring 40. The spring 40 and the outer ring 10 can be assembled integrally.

The conventional springs of the wave washer type are disadvantageous in cost because their production yield is low. Spring useful in the practice of the present invention can be formed from a wire of a modified shape or the like, so that they cay be produced in good yield and are also advantageous in cost.

The fixing structure according to the first embodiment of the present invention will now be described with reference to FIGS. 4 through 6.

Figure 4:
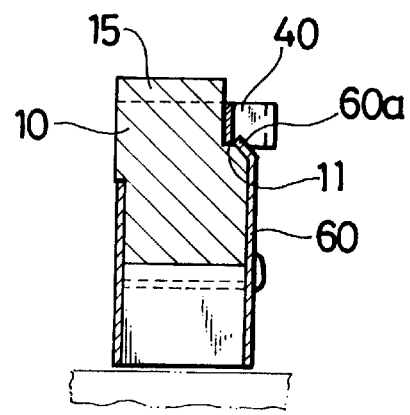
FIG. 4 is a side cross-sectional view of a fixing structure according to a first embodiment of the present invention.
Figure 5:
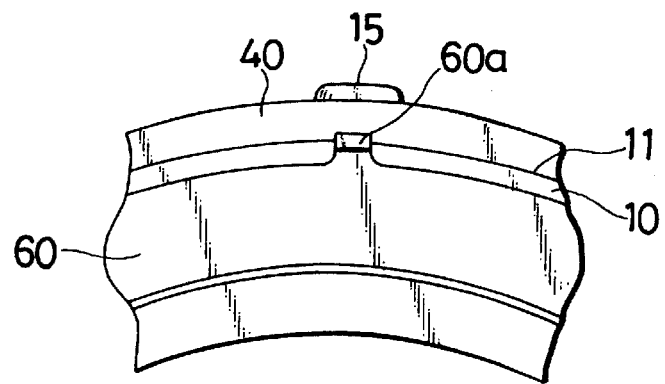
FIG. 5 is an enlarged fragmentary front view of the fixing structure of FIG. 4.

Reference is first had to FIGS. 4 and 5. Using the resilient force which acts in radial directions as described above, the spring 40 is assembled on a stepped outer peripheral portion 11 of the outer ring 10. A tab 60a is formed on an outer peripheral edge portion of the side plate 60, and the tab 60a is bent onto a stepped outer peripheral portion 11 of the outer ring 10 to limit any axial movement of the spring 40.

Figure 6:
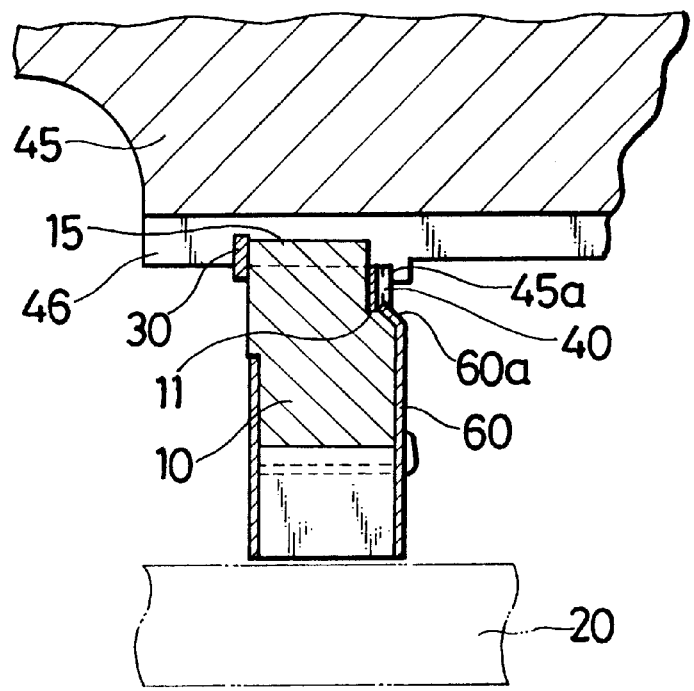
FIG. 6 is a cross-sectional view showing a one-way clutch, which has been assembled using the fixing structure of the first embodiment, together with a housing on which the one-way clutch is assembled.

Referring next to FIG. 6, the spline 15 of the outer ring 10 is fitted in the corresponding keyway 46. The spring 40 is interposed between the outer ring 10 and the opposing inner wall 45a of the housing 45, whereby the outer ring 10 is pressed against the stopper ring 30.

Figure 7:
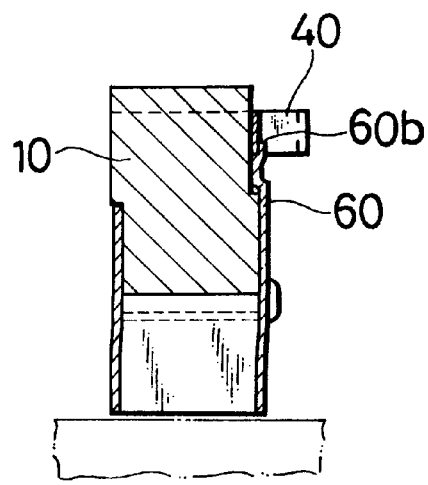
FIG. 7 is a side cross-sectional view of a fixing structure according to a second embodiment of the present invention.
Figure 8:
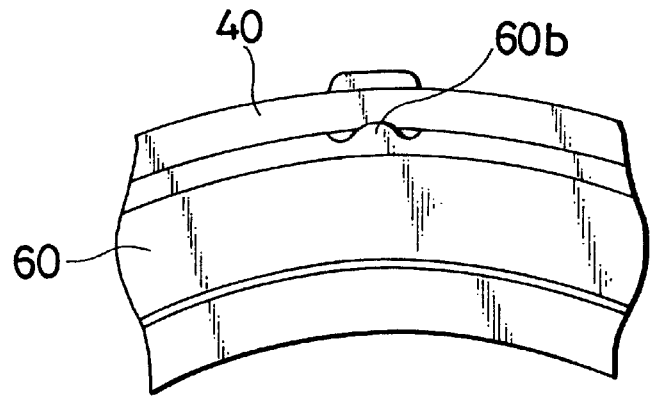
FIG. 8 is an enlarged fragmentary front view of the fixing structure of FIG. 7.
Figure 9:
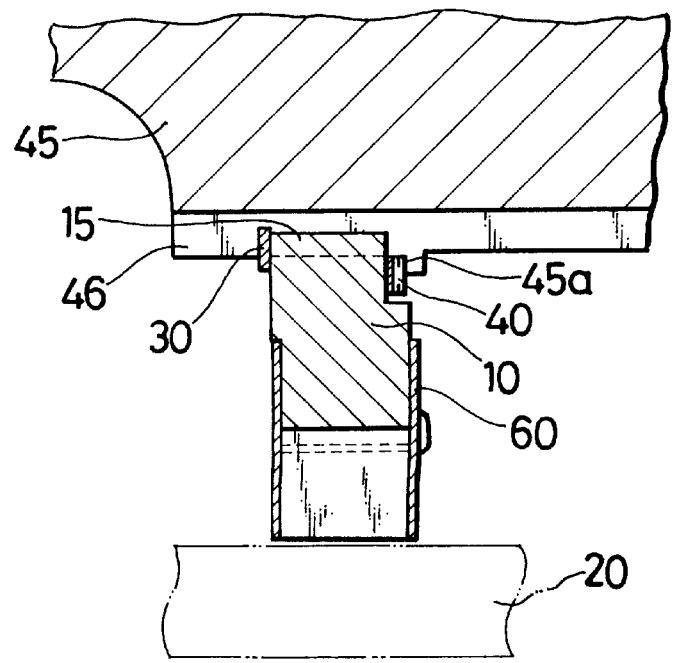
FIG. 9 is a side cross-sectional view of a conventional one-way clutch.
Figure 10:
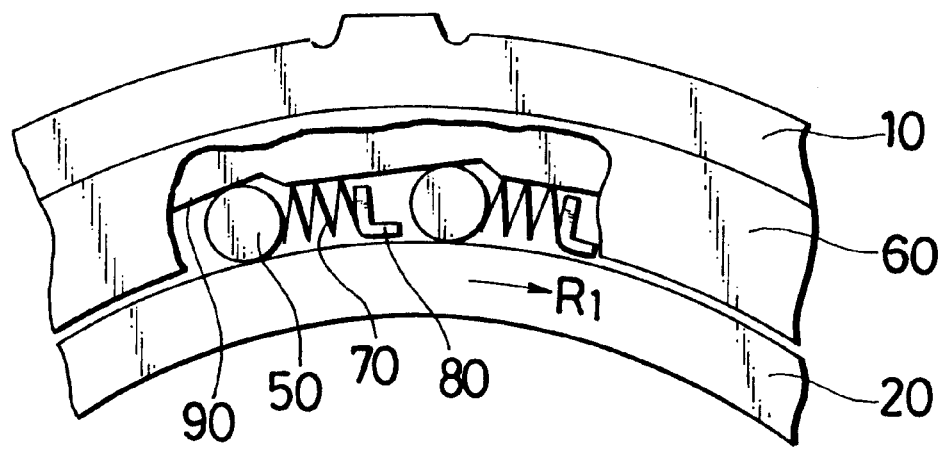
FIG. 10 is a front view of the conventional one-way clutch, in which a side wall is partly cut away to show an internal mechanism.
Figure 11:
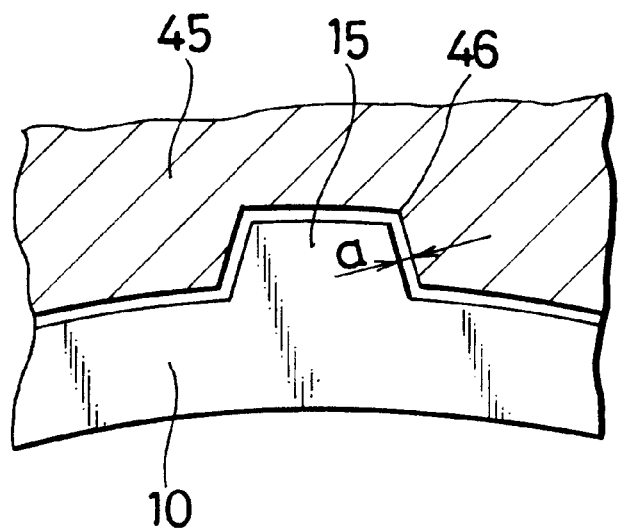
FIG. 11 is an enlarged fragmentary front view of the conventional one-way clutch of FIG. 10.

The fixing structure according to the second embodiment of the present invention will hereinafter be described with reference to FIGS. 7 and 8. On an outer periphery of the side plate 60 which is in turn mounted integrally on the outer ring 10, the spring 40 is assembled owing to the resilient force acting in radial directions. The spring 40 and the outer ring 10 are therefore assembled together as an integral unit.

Further, a tongue-shaped portion 60b is formed on the outer peripheral edge portion of the side plate 60 to limit any axial movement of the spring 40. This tongue-shaped portion 60b is maintained in engagement with the tongue-shaped portion 60b and hence limits the axial movement of the spring 40.

As has been described above, the spring 40 in the present invention is held by the outer ring 10 or a portion of the side plate 60 (the outer peripheral wall in the second embodiment) but is not fixed in the angular direction. Under the spring force acting in the axial direction like the conventional spring of the wave washer type, the spring 40 is always maintained in contact with the outer peripheral wall of the outer ring 10 and the opposing inner wall 45a of the housing 45, thereby making it possible to avoid occurrence of a sharp metallic hitting noise.

What is claimed is:

1. In a fixing structure for use with a one-way clutch having an outer ring, said fixing structure including a ring-shaped leaf spring having angular waviness and interposed between an outer side wall of said outer ring and an opposing inner wall of a housing, the improvement in the fixing structure wherein:

said ring-shaped leaf spring defines a cut formed in a radial direction to make said ring-shaped leaf spring discontinuous as viewed in an angular direction;

a side plate which is mountable on said outer ring, whereby said ring-shaped leaf spring is integrally assembled by resilient force, which acts in radial directions, on said outer ring or an outer periphery of said side plate; and wherein any axial movement of said ring-shaped leaf spring is limited by a portion of said side plate.

2. A fixing structure according to claim 1, wherein said ring-shaped leaf spring comprises a waved plate portion having plural waved parts arranged at an interval along a periphery of said ring-shaped leaf spring.

3. A fixing structure according to claim 2, wherein said ring-shaped leaf spring has been formed from a wire of a modified shape.

4. In a fixing structure for use with a one-way clutch having an outer ring, said fixing structure including a ring-shaped leaf spring having angular waviness and interposed between an outer side wall of said outer ring and an opposing inner wall of a housing, the improvement in the fixing structure wherein:

said ring-shaped leaf spring defines a cut formed in a radial direction to make said ring-shaped leaf spring discontinuous as viewed in an angular direction;

a side plate which is mountable on said outer ring, whereby said ring-shaped leaf spring is integrally assembled by resilient force, which acts in radial directions, on said outer ring or an outer periphery of said side plate;

wherein any axial movement of said ring-shaped leaf spring is limited by a portion of said side plate; and wherein a tab is formed on an outer peripheral edge portion of said side plate, and said tab is bent onto a stepped outer peripheral portion of said outer ring to limit the axial movement of said ring-shaped leaf spring.

5. A fixing structure according to claim 1, wherein a tongue-shaped portion is formed on an outer peripheral edge portion of said side plate, and the tongue-shaped portion is maintained in engagement with said ring-shaped leaf spring to limit the axial movement of said ring-shaped leaf spring.

* * * * *